June 19, 1923.
F. KRUSE
1,459,062
SAUSAGE TWISTING DEVICE
Filed April 16, 1921   3 Sheets-Sheet 3
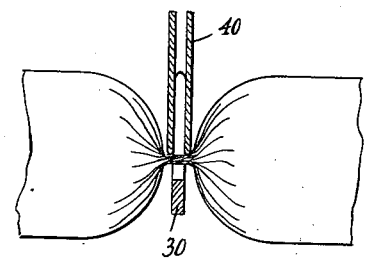
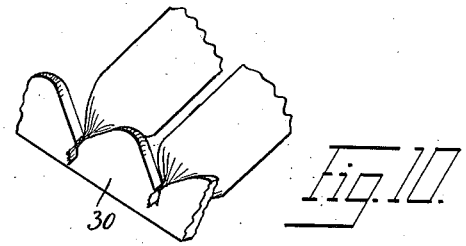
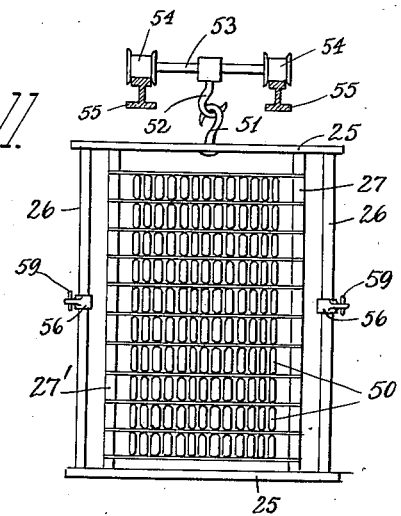
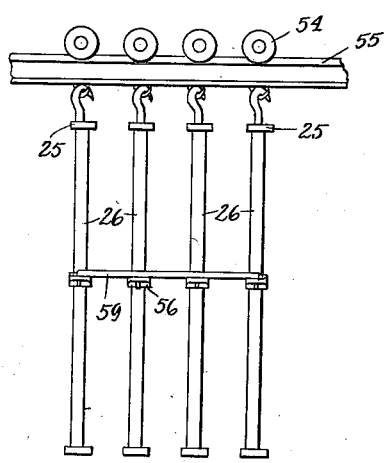
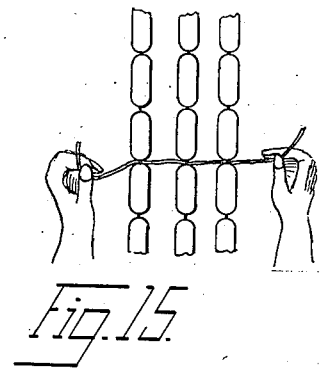
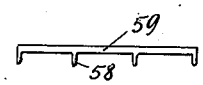
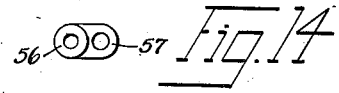
Ferdinand Kruse  INVENTOR.
BY
ATTORNEYS Patented June 19, 1923.

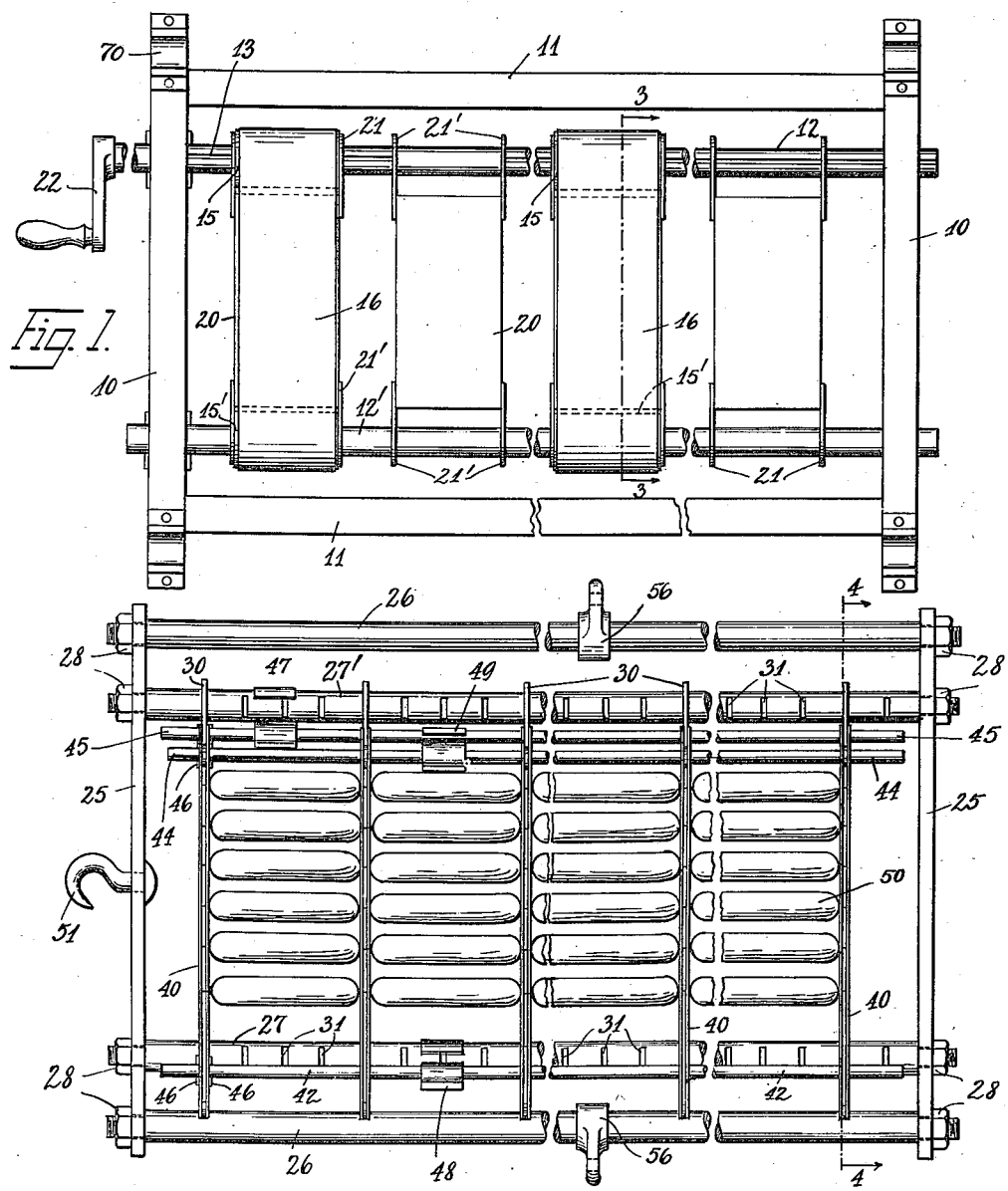

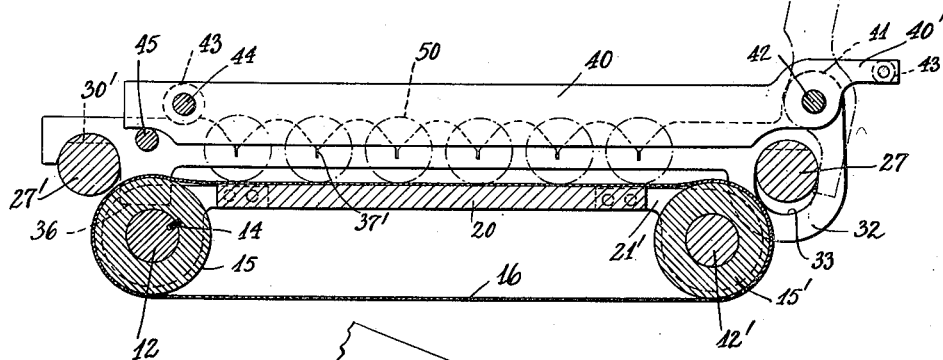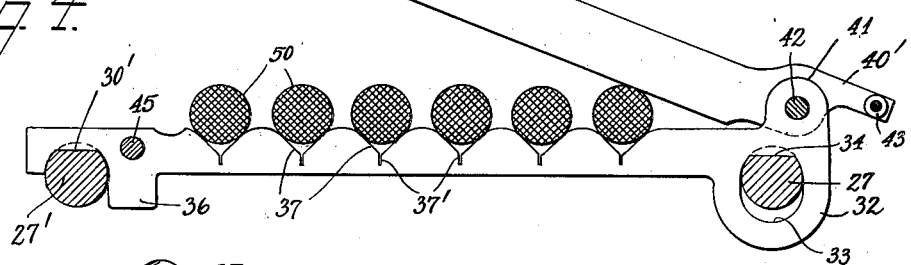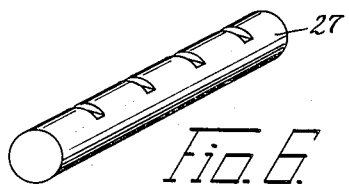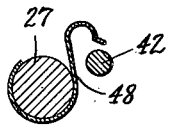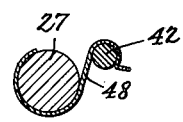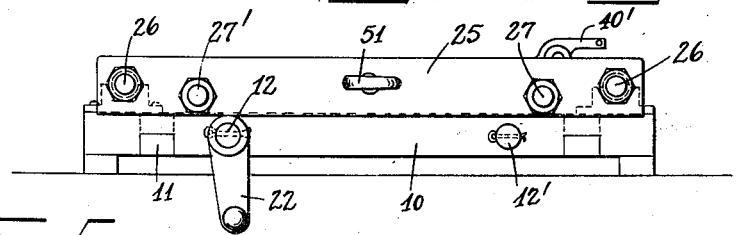

1,459,062

UNITED STATES PATENT OFFICE.

FERDINAND KRUSE, OF PORT RICHMOND, NEW YORK.

SAUSAGE-TWISTING DEVICE.

Application filed April 16, 1921. Serial No. 461,879.

*To all whom it may concern:*

Be it known that I, FERDINAND KRUSE, a citizen of the United States, and a resident of Port Richmond, in the county of Richmond and State of New York, have invented certain new and useful Improvements in Sausage-Twisting Devices, of which the following is a specification.

This invention relates generally to the manufacture of sausages, having more particular reference to a machine for forming the individual lengths or links of sausage.

The invention has for an object to provide a simple, efficient, and easily operated machine for the above purpose, a further object being the provision of means for forming the sausage into links of different lengths as may be desired.

Another object of the invention is the provision of a portable forming frame which may be readily removed with the finished sausages thereon and hung in a suitable drying or curing chamber.

For further comprehension of the invention, and of the objects and advantages thereof, reference will be had to the following description and accompanying drawings, and to the appended claims in which the various novel features of the invention are more particularly set forth.

Figure 1 of the drawings is a plan view of the base portion of the sausage forming machine.

Figure 2 is a plan view of the top portion, or portable forming frame.

Figure 3 is a transverse section of the complete machine, this view being taken at the point indicated by the line 3—3 on Fig. 1.

Figure 4 is a detail transverse section on the line 4—4 of Figure 2.

Figure 5 is an end view of the complete machine.

Figure 6 is a detail fragmentary perspective view of one of the longitudinal bars of the portable forming frame, indicating the slots for positioning the former blades.

Figure 7 is a detail transverse section showing the means for locking the former blades to the forming frame, showing the locking element in inoperative position.

Figure 8 is a similar view with the locking element in operative position.

Figure 9 is an enlarged detail transverse section through one of the forming elements, indicating the sausage engaged thereby.

Figure 10 is a detail fragmentary perspective view of one of the stationary former bars, indicating also the manner in which the sausages are engaged therewith.

Figures 11 and 12 are diagrammatic elevations at right angles to one another, indicating the manner of suspending the portable frame, with the rows of completed sausages carried thereby.

Figure 13 is a detail side view of the link for connecting together the series of portable frames when suspended as in Figure 12.

Figure 14 is a detail plan view of one of the arms with which said link engages.

Figure 15 is a diagrammatic elevation showing the manner of tying together a series of these sausages.

As here shown my improved sausage forming machine may be said briefly to comprise a base member, and a portable forming frame resting on said base member, the base member being provided with means adapted to support and twist the sausages.

As here shown the base member comprises a pair of end bars 10, rigidly united by the longitudinal side bars 11. Extending longitudinally of this base member, adjacent the side bars 11, are a pair of shafts 12, 12' suitably journaled at opposite ends in the end bars 10. The shaft 12 has a key-way 13 cut therein to receive freely keys such as 14 carried by a series of rollers 15 which are free to slide along the shaft 12. A like series of rollers 15' is freely mounted on shaft 12', endless belts 16 being looped over these rollers 15 and 15'. Interspaced between the belts 16 are horizontal plates 20 whose upper surfaces are on a substantial level with the top reaches of the belts. These plates 20 may be supported from the shafts 12, 12', to have longitudinal adjustment thereof, by means of eye-elements 21 fixed to the ends thereof and engaging over the said shafts. The shaft 12 may have a handle 22 on one end thereof for purposes of rotation, or other suitable means for imparting movement to the belts 16 may be provided.

Referring now to the portable former frame, the same comprises a pair of end bars 25 rigidly united by an outer pair of side rods 26 and an inner pair of side rods 27, 27', these rods being here shown as having diminished ends which project freely through suitable apertures in the end bars 25 and have nuts 28 threaded on their ends.

Upon the inner pair of rods 27, 27', are mounted the former elements, which comprise hinged and stationary blades extending transversely between the rods 26 and which are adapted for adjustment to different spacing along the latter. The stationary blades are indicated at 30 and comprise relatively long and narrow members arranged to lie in vertical planes. To localize these blades 30 in adjusted positions the rods 27, 27' have transverse notches 31 cut in their top sides in which the blades rest. At one end thereof these blades have widened heads such as 32 in which are apertures 33 through which the rods 27 pass freely, these apertures being flattened on their upper sides as at 34 and being vertically elongated to permit of the headed ends of the blades 30 being lifted sufficiently to clear the flattened elements 34 from the notches 31.

At their opposite ends the blades 30 are notched on their undersides as at 30' to take over the shaft 27', these notches presenting flat inner walls which rest in the bottoms of the notches 31. It will be understood of course, that the blades 30 will fit snugly in the notches 31 so as to be held in an upright position. As shown in Figure 3 the heads 32 project into the path of movement of the rollers 15 and eye elements 21, while they are formed at the opposite end with integral lugs such as 36 which project into the path of movement of the rollers 15' and eye-elements 21'. This arrangement permits of the belts 16 and plates 20 being carried along the shafts 12, 12' with the former blades as the latter are adjusted from one position to another. The blades 30 have tapering recesses 37 cut in their upper edges, which recesses terminate at the bottom in narrow notches 37'.

The hinged former blades are indicated at 40 and are arranged in pairs, one pair to each of the stationary blades 30 and arranged one on each side thereof. To support these blades 40 the heads 32 on the stationary blades 30 have upwardly extending ears such as 41 formed thereon, these ears projecting between the blades 40 and to which the latter are pivotally attached through the medium of a longitudinal rod 42 which passes freely through registering apertures in the ears 41 and the hinged blades 40. The blades 40 are here shown with projecting tails 40' riveted upon opposite sides of spacer studs 43 whereby the ends of each pair of these blades 40 are rigidly secured together. At their opposite ends the blades are fixed to spacer washers 43, a longitudinal rod 44 passing freely through these washers and the blades. A longitudinal rod 45 also passes freely through the adjacent ends of the former blades 30, and acts as a stop for the movable blades 40, limiting the downward movement of these blades to the position shown in Fig. 3 in which position it will be noted that the lower edges of the blades terminate just at the beginning of the narrow notches 37' thereby insuring that substantially all the chopped meat in those portions of the casing engaged by the blades will be squeezed sideways until the skin which remains at the said portions is received in the narrow notches 37' whereby a direct shearing upon the casing is prevented. These rods 42, 44 and 45 having cotter pins 46 inserted through one end on opposite sides of one of the end former elements to retain them against longitudinal displacement. The former elements may be locked to the rods 27, 27' by means of spring clips 47, 48 and 49, the first two of which are carried by the rods 27, 27' and engage over the rods 42 and 45 respectively, while the other one is carried by the rod 45 and engages over the rod 43.

As indicated in Figures 11 and 12, the portable forming frame, with the sausages indicated at 50 still carried thereby is adapted to be removed from the base member and suspended in a suitable drying or curing chamber. To this end one of the end bars 25 has a hook 51 fixed thereto which is adapted for suspension from a hook 52 depending from an axle member 53 carried by a pair of rollers 54 running on track rails 55 suitably mounted in the said chamber. As indicated in Figure 13, a series of these frames are adapted to be linked up together and to this end the rods 26 have collars 56 fixed thereon each of which has an integral eye element 57 formed thereon, these eye elements being adapted to be engaged by prongs 58 projecting downwardly from links 59, there being one of these links 59 extending across each side of the series of frames, as will be understood.

The manner of use of my improved sausage forming machine is as follows: The notches 31 in the rods 27, 27' may be of such longitudinal spacing as may be desired for the formation of individual sausages of varying lengths. As will be understood, when setting the machine to form sausages of any given length the former elements will be individually adjusted until they are evenly spaced at the required distance apart from one another. To effect this adjustment the clips 47, 48 and 49 are released. The former blades 30 may then be individually raised until the ends thereof clear the notches 31 and they may then be shifted to the desired positions and the clips re-engaged. The plates 20 and belts 16, which are alternately spaced between the former elements as shown in Figures 1 and 2 are moved with the former elements, as will be understood.

The hinged blades 40 are swung upwardly, as indicated in dotted lines in Figure 3, and the lengths of sausage laid in the recesses 37, as indicated in Figure 4. These hinged blades 40 are then swung down until they rest upon the sausage lengths on their upper sides, the belts 16 are now rotated, the weight of the blades 40 gradually forcing the sausages downward and contracting them until they enter the recesses 37' and rest on the belts and plates, the meat being forced in opposite directions until only the skin enters the notches 37'.

By turning handle 22 the belts are caused to travel and as such belts engage alternate lengths or links of sausage it will be apparent that a relative twist will be given alternate lengths, twisting the skin in the notches.

The portable frame is then lifted from the base member, (the end bars 10 whereof being formed with semi-circular seats 70 on which the rods 26 rest freely) and suspend from one of the hooks 52, and a new frame inserted in place on the base member, a series of these frames being linked together as shown in Figure 12.

When the sausages are properly cured a cord 71 may be passed around any number thereof to bind them together as indicated in Figure 15.

Having thus described my invention what I claim as new and desire to protect by Letters Patent of the United States is as follows:

1. In a sausage forming machine, means to compress and form a sausage casing comprising a stationary blade and a blade relatively movable thereto, one of said blades being provided with a tapering recess terminating in a narrow notch, said movable blade adapted to be urged toward the stationary blade to force the sausage casing into said recess.

2. In a sausage forming machine, a base member, a frame removably supported thereon, a series of elements carried by said frame and adapted to contract a length of sausage at selected points, and means mounted upon said base member adapted to impart a rotary movement to said sausage at certain points.

3. In a sausage forming machine, means to compress and form a sausage casing comprising a stationary blade and a blade relatively movable thereto, one of said blades being provided with a tapering recess terminating in a narrow notch, said movable blade adapted to be urged toward the stationary blade to force the sausage casing into said recess, and means to prevent said movable blade from squeezing said casings against the bottom of said recess.

4. In a sausage forming machine, a series of former elements, each of said elements provided with means to simultaneously engage a plurality of sausage casings, and means adapted to support said former elements at varying distances from one another.

5. In a sausage forming machine, a series of former elements, and means adapted to support said former elements at varying distances from one another said means including a pair of rods provided with longitudinally spaced recesses with which said former elements may be detachably engaged.

6. In a sausage forming machine, a base member, a frame removably supported thereon, said frame including a pair of longitudinal side members, and former elements supported by said side members, said former elements each comprising a single blade and a pair of blades adapted to engage on opposite sides thereof and movable with respect to the single blade.

7. In a sausage forming machine, a base member, a frame removably supported thereon, said frame including a pair of longitudinal side members, stationary former blades supported on said side members to be adjustable therealong, and movable former blades hinged to the stationary blades.

8. In a sausage forming machine, a base member, a frame removably supported thereon, said frame including a pair of longitudinal side members, stationary former blades supported on said side members to be adjustable therealong, and movable former blades hinged to the stationary blades, there being a pair of said movable blades for each stationary blade arranged one on each side thereof.

9. In a sausage forming machine, a base member, a frame removably supported thereon, said frame including a pair of longitudinal side members, stationary former blades supported on said side members to be adjustable therealong, and movable former blades hinged to the stationary blades, said longitudinal side members presenting longitudinally spaced notches in which said stationary blades engage.

10. In a sausage forming machine, a base member, a pair of shafts supported thereby, a series of rollers having a drive connection with said shafts and adjustable therealong, belts looped over said rollers, a series of plates arranged between said belts, means supporting said plates from said shafts to be adjustable longitudinally thereof, and a frame supported on said base member and provided with means for contracting a length of sausage at selected points.

11. In a sausage forming machine, a base, a frame removably supported on said base, means carried by said frame for contracting and forming the sausage casing, and for securing the formed sausages to said removable frame.

12. In a sausage twisting machine, means to squeeze the sausage casings at spaced intervals to divide them into links, said means comprising a plurality of spaced cooperating pairs of former blades, one of the blades of each pair being provided with a plurality of spaced tapering recesses into which the casings are adapted to be squeezed by the other blade of the pair, and means to twist the squeezed casings to secure them in linked condition comprising travelling belts and stationary supports alternately arranged in the spaces between said former blades, said supports acting to frictionally engage and cooperate with said travelling belts to twist the casings.

13. In a sausage forming machine, means to compress and form a sausage casing comprising a stationary blade and a pivoted blade one of said blades having a plurality of tapering recesses therein, terminating in a narrow notch, said pivoted blade adapted to be urged toward the stationary blade to force the sausage casing into said recesses.

14. In a sausage forming machine, means to compress and form a sausage casing comprising a stationary blade and a pivoted blade one of said blades having a plurality of tapering recesses therein, terminating in a narrow notch, said pivoted blade adapted to be urged toward the stationary blade to force the sausage casing into said recesses, and means to prevent said pivoted blade from pressing the casing against the bottom of said notch.

Signed at New York, in the county of New York and State of New York, this 11th day of April A. D. 1921.

FERDINAND KRUSE.